J. P. FULGHUM.
Grass-Seed Attachments to Grain-Drills.
No. 140,694. Patented July 8, 1873.
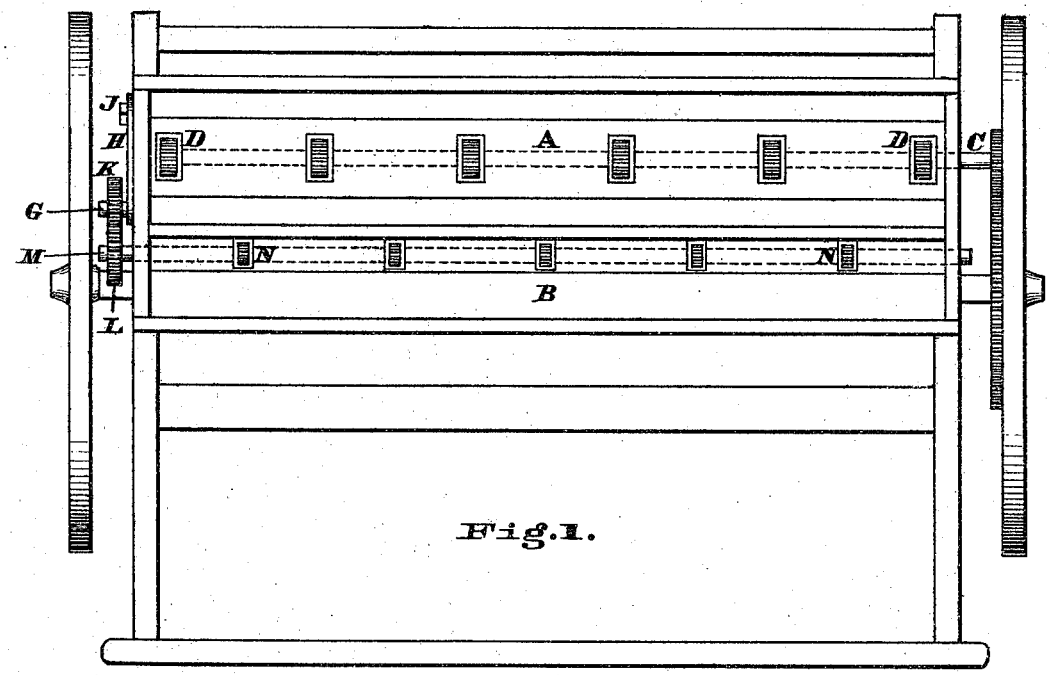
Fig. 1.
Fig. 2. Fig. 3.
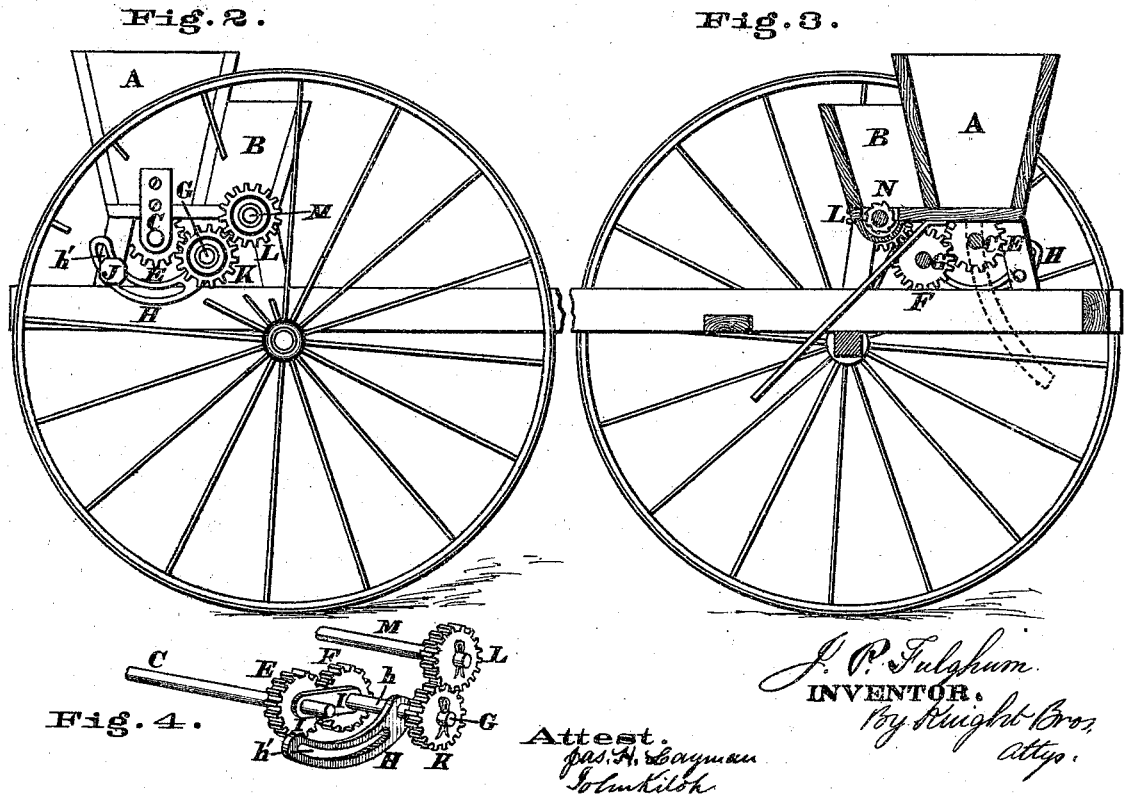
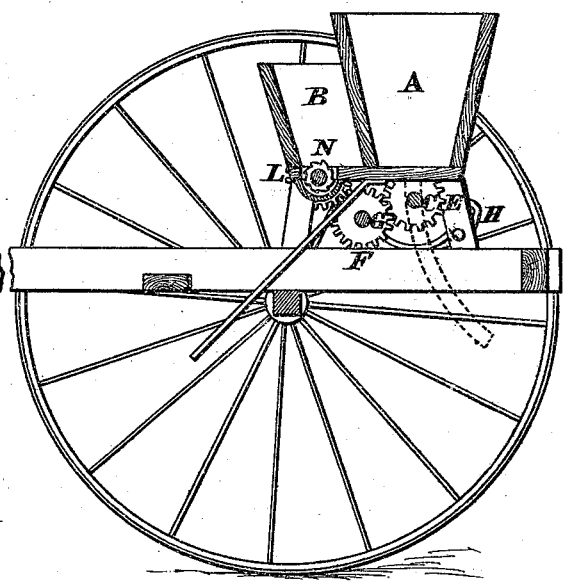
Fig. 4.
Attest.
Jas. H. Layman
John Kiloh
J. P. Fulghum
INVENTOR.
By Knight Bros.
Attys.

UNITED STATES PATENT OFFICE.

JESSE P. FULGHUM, OF DUBLIN, INDIANA, ASSIGNOR TO HIMSELF AND WAYNE AGRICULTURAL COMPANY.

IMPROVEMENT IN GRASS-SEED ATTACHMENTS TO GRAIN-DRILLS.

Specification forming part of Letters Patent No. 140,694, dated July 8, 1873; application filed April 10, 1871.

*To all whom it may concern:*

Be it known that I, JESSE P. FULGHUM, of Dublin, in the county of Wayne, Indiana, have invented a new and useful Improved Grass-Seeding Attachment for Grain-Drills, of which the following is a specification:

This invention relates to the employment of positive or force feed-wheels for discharging the grass-seed. The invention consists in gearing for driving these wheels from the grain feed-shaft at variable relative speed, so as to insure the delivery of the grass-seed in any desired quantity.

Figure 1 is a plan view of a grain-drill illustrating this invention. Fig. 2 is an end elevation thereof. Fig. 3 is a transverse section. Fig. 4 is a perspective view of the gearing.

A represents the grain-box or hopper of an ordinary grain-drill, and B the grass-seed box attached thereto. C is the rod or shaft which carries the series of feed-wheels D, for delivering the grain. This shaft may be driven from one of the ground-wheels in any customary way, and at the opposite end to that at which it receives its motion it is furnished with a spur-wheel, E, which gears with another wheel, F, on the end of a shaft, G, that is journaled within and passes through a jack-plate, H. A link, I, uniting the shafts C and G, supports the wheel F in proper mesh with the wheel E. The jack-plate H has at one end a hub, $h$, in which the shaft G is journaled. It is attached to the frame or hopper-head by a bolt, J, passing through a slot, $h'$, and the shaft G is thus fixedly supported in any desired position. The outer end of the shaft G carries a readily-removable spur-wheel, K, which gears with a similar wheel, L, on the end of a shaft, M. This shaft M is journaled longitudinally under or in the bottom of the grass-seed box B, and carries a series of minute feed-wheels, N, which may be similar in construction to those which deliver the grain. A positive or force feed insuring the delivery of the grass-seed is thus provided.

Either or both of the wheels K L may be removed, and larger or smaller wheels substituted on the respective shafts, as may be necessary to increase or reduce the relative speed of the grass-seed feed-shaft to the desired extent. The slotted jack-plate H permits this employment of changeable gearing, and supports the intermediate shaft G in its different positions with equal efficiency. It also serves to hold the spur-wheel K out of mesh, to render the shaft M inoperative when grass-seed is not to be sown. When the shaft M is not thus disconnected, as in ordinary use, it is stopped and started simultaneously with the shaft C, and any separate clutch or stopping mechanism is dispensed with.

The grass seed as delivered by the wheels N may be scattered by means of a suitable rack or chute, such as described in my patent for seed-drill, granted July 9, 1867, No. 66,578.

The provision of a grain-drill with a grass-seeding attachment is not claimed herein as new, nor the employment of interchangeable gear-wheels of diverse sizes, for giving a variable feed; such features of the gearing for connecting the two feed-shafts of this machine as are shown in my patent, No. 100,998, dated March 22, 1870, are also disclaimed, as forming no part of the present invention, in themselves considered.

The following is claimed as new, viz:

The combination of the feed-shafts C M, counter-shaft G, gearing E F and K L, jack-plate H, link I, and bolt J, arranged and operating substantially as herein described, for the purpose specified.

In testimony of which invention I hereunto set my hand.

JESSE P. FULGHUM.

Witnesses:
GEO. H. KNIGHT,
JAMES H. LAYMAN.